United States Patent
Marek et al.

(10) Patent No.: US 9,411,992 B1
(45) Date of Patent: Aug. 9, 2016

(54) PROTOCOL MANAGEMENT METHOD FOR A PASSIVE RF IDENTIFICATION DEVICE WHICH CAN HARVEST POWER FROM DIFFERENT POWER SOURCES

(71) Applicant: EM Microelectronic-Marin S.A., Marin (CH)

(72) Inventors: Tomas Marek, Sulice-Hlubocinka (CZ); Jan Bicak, Milovice (CZ); Jiri Kolman, Prague (CZ); Petr Bily, Prague (CZ)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 14/683,445

(22) Filed: Apr. 10, 2015

(51) Int. Cl.
*G06K 7/10* (2006.01)
(52) U.S. Cl.
CPC .................................. *G06K 7/10158* (2013.01)
(58) Field of Classification Search
None
See application file for complete search history.

(56) References Cited

U.S. PATENT DOCUMENTS 8,456,282 B2 * 6/2013 Burkart ............. G06K 19/0701
340/10.34

FOREIGN PATENT DOCUMENTS

ZA    WO 2011159171 A2 * 12/2011 ........... H04B 5/0031

* cited by examiner

*Primary Examiner* — Daniell L Negron
(74) *Attorney, Agent, or Firm* — Oblon, McClelland, Maier & Neustadt, L.L.P

(57) ABSTRACT

The protocol management method concerns a RFID transponder which comprises first and second field detectors respectively for first and second interrogation fields in order to watch for the reception of these first or second interrogation fields at least respectively during executions of corresponding first and second communication protocols. If during the execution of a communication protocol the reception of the corresponding interrogation field is no more detected by the corresponding field detector while the power provided by the power generator remains equal or superior to the requested power level, then this communication protocol is stopped and the RFID transponder enters a Standby state. When the transponder is in this Standby state, the corresponding field detector continues to watch for the reception of the corresponding interrogation field in order to detect if it is again received and, if this is the case, to trigger a restart of this corresponding communication protocol.

20 Claims, 2 Drawing Sheets

PROTOCOL MANAGEMENT METHOD FOR A PASSIVE RF IDENTIFICATION DEVICE WHICH CAN HARVEST POWER FROM DIFFERENT POWER SOURCES

FIELD OF THE INVENTION

The present invention concerns a protocol management method for a passive RF identification device (RFID) which is arranged for harvesting power from at least a first reader sending a first interrogation field at a first frequency and from an independent second reader sending a second interrogation field at a second frequency different from the first frequency. Such a device is also named RFID transponder or RFID tag and can be incorporated in a card or in any other portable device, e.g. a wristwatch.

In particular, the identification device has a first interface arranged to carry out a first communication protocol with the first reader and a second interface to carry out a second communication protocol with the second reader. Further, the identification device comprises a power generator arranged for allowing the second reader to partially or fully power supply this identification device while the first interface is in an active state and the first communication protocol is executed, and for allowing the first reader to partially or fully power supply this identification device while the second interface is in an active state and the second communication protocol is executed.

BACKGROUND OF THE INVENTION

The international patent application WO 2011/159171 describes a passive RFID transponder with an UHF interface comprising an UHF antenna and a dual frequency LF-HF Interface comprising a LF antenna and an HF antenna. The dual frequency LF-HF Interface carries out an IP-X protocol in which a LF demodulator and an HF modulator is used. It is to be noted that the dual frequency LF-HF interface is intended to communicate with a same dual frequency reader. The passive RFID transponder further comprises an UHF rectifier and a LF rectifier which can both generate a power supply for this transponder. More particularly, a decision circuit is provided for selecting either the LF rectifier or the UHF rectifier as power generator depending on which one delivers the largest signal. The identification device needs from its power generator at least a first determined power level for the execution of the UHF communication protocol and at least a second determined power level for the execution of the IP-X communication protocol.

The passive RFID transponder further comprises a digital controller formed by an UHF logic unit, an IP-X logic unit and a single shared non-volatile memory (EEPROM). The transponder is arranged for detecting which kind(s) of reader is/are present and for responding accordingly. Depending on which energy source is present and the strength of that energy source, the digital controller selects either the UHF logic unit or the IP-X logic unit or both, and executes respectively an UHF protocol, an IP-X protocol or both.

The RFID transponder comprises a detector circuit forming an UHF detector and a LF detector which are respectively able to detect the presence of an UHF energizing signal and of a LF energizing signal before starting with one or two communication protocol(s). The document WO 2011/159171 only considers different situations wherein the transponder enters the field of a first UHF reader or the field of a second DF reader (DF being used for Dual Frequency, in this case LF-HF), as well as when the transponder enters simultaneously in both fields of the first and second readers. In this last case where both an UHF and a DF readers are present, the transponder may power up from either the UHF or the LF field or both. The method of operating the transponder comprises the step of causing the transponder, while being exposed to either an UHF or a LF energizing field or both, automatically to power up from the received energizing field(s) and to respond at either the first reader or the second reader or both of these. Thus, this document only considers the case where the transponder is in a power-down state and then enters a space wherein one or the other field or both fields is/are present, what causes the transponder to power up. As it is usual in passive transponders, a POR function (Power_ON Reset) is implemented in order to detect that a change between a power-down state and a power-up state (also named power_ON state) of this transponder has occurred, and to reset this transponder before starting the execution of one or the other protocol or both.

The document WO 2011/159171 ignores e.g. situations wherein one of the field disappears and not the other one. This document does not consider some problems related to the fact that two readers can at the same time provide respective energizing fields to the identification device while communicating at least with one of them, so that the transponder can remains in a power-up/power_ON state while an interrogation field intervening in the execution of one communication protocol is suddenly no more received by the transponder.

SUMMARY OF THE INVENTION

The present invention first concerns the highlight of new problems associated with passive multi-frequency transponders which are designed to communicate with different and independent readers. In the frame of development of a new RFID product, the inventors have brought out a main problem with respect to the above mentioned transponder of the prior art. Indeed, the prior art document considers a transponder in a power-down state which then receives one or the other field or both fields of two readers able to communicate with this transponder. When the transponder powers up, this transponder is reset and one or two interface(s) is/are activated and one or the two corresponding protocol(s) is/are executed as a consequence of the power_ON signal and of which energizing field(s) is/are detected. Thus, the starting of a communication protocol is always triggered by the POR function of the transponder, as it is implemented in single frequency transponders.

The document WO 2011/159171 does not analyze the following situations and does not solve the following corresponding problems:

A) In a first period, the transponder receives both interrogation fields and can harvest power from both readers. Then, during the execution of a first communication protocol the transponder does no more receive the corresponding first interrogation field, because e.g. the transponder or the corresponding reader has moved, or does no more correctly receive this first interrogation field while still receiving an energizing field from the other reader. In such a case, even if the corresponding first reader stops sending its energizing field for driving the transponder in a power-down state, this transponder will continue to wait for a continuation of the first communication protocol because it will not be powered-down, the energizing field of the other reader still powering the transponder. The first communication protocol could thus be stopped in any step and remains in the corresponding state in which for example protected data could be maintained in a register or an access to protected words of the non-volatile memory could be easily possible for a further reader. Such a situation could thus be problematic.

B) In the situation described in point A), the first reader wants to start anew the first communication protocol by stopping the sending of its energizing field to power-down the transponder and then, after a certain time interval, by starting again to send its energizing field in order to power-up the transponder and to trigger its POR function, as it is usual. However, such a classical procedure will have no effect on the first communication protocol which remains in an intermediate state so that the first communication protocol will not be driven in its initial state allowing a new execution of this protocol. Such a situation can stay for a long time, at least until the other reader stops providing its energizing field and maybe further because, when this other reader will stop sending its energizing field, the first reader can already been energizing the transponder and the POR function will thus not yet be executed.

C) The transponder can communicate with two independent readers. Thus, if the transponder is first powered-up by both readers, the transponder will reset and both protocols will be configured. Then, after a first execution of the UHF protocol the UHF reader is turned OFF and the DF reader is used to write some data in the shared NVM, in particular data relative to the UHF protocol configuration or to a specific protocol/mode selection. After a certain period of time, assuming the UHF protocol is ready for a new execution, the UHF reader is turned ON and this new execution occurs. This can be problematic because such a new execution will still be done with the old UHF protocol configuration, the transponder having not being reset and reconfigured after a succession of a power-down step and a power-up step triggering the POR function.

In particular for solving the above identified problems, the present invention concerns a protocol management method for a passive RF identification device of the type given before in the domain of the invention, wherein the identification device comprises a first field detector for the first interrogation field, which is at least activated during an execution of the first communication protocol to watch for the reception of this first interrogation field, and a second field detector for the second interrogation field, which is at least activated during an execution of the second communication protocol to watch for the reception of this second interrogation field, and wherein the identification device needs from its power generator at least a first determined power level for the execution of the first communication protocol and at least a second determined power level for the execution of the second communication protocol. If during the execution of any communication protocol among the first and second communication protocols the reception of the corresponding first or second interrogation field is no more detected by the corresponding first or second field detector while the power provided by the power generator remains equal or superior to the corresponding first or second determined power level, then this communication protocol is stopped and the identification device enters a Standby state with respect to this communication protocol. This Standby state is a state in which the power provided by the power generator remains equal or superior to the corresponding first or second determined power level. When the identification device is in the Standby state associated to the first or second communication protocol, the corresponding first or second field detector continues to watch for the reception of the corresponding first or second interrogation field in order to detect if this corresponding first or second interrogation field is again received by the identification device and, if this is the case, to trigger a restart of this first or second communication protocol.

Thanks to the protocol management method according to the present invention, a communication protocol will no more stay in an indefinite state or intermediate state when the reception of the corresponding interrogation field is interrupted during a communication protocol while the power provided by the power generator of the RF identification device remains equal or superior to the corresponding determined power level, due to the reception of another interrogation field from another reader. Then, a restart of the concerned communication protocol does not need a POR signal of the RF identification device because such a restart will be triggered only by the detection signal of the corresponding field detector when the power provided by the power generator of the RF identification device remains equal or superior to the corresponding determined power level. Further, at the end of a communication protocol when the corresponding reader indicates that the communication protocol have to be stopped and to return to its initial state by interrupting the interrogation field provided by this reader, the transponder will be driven in the Standby state with respect to this communication protocol, from which the transponder will initiate a new execution of the communication protocol when the reader will restart providing its interrogation field.

According to a preferred embodiment, a communication protocol is reset when the identification device enters the Standby state with respect to this communication protocol.

In a particular variant, when the identification device enters the Standby state with respect to a communication protocol, the corresponding interface carrying out this communication protocol is at least partially deactivated. In particular, an analog front end of the corresponding interface is deactivated while the corresponding field detector remains active.

In a further preferred embodiment, after the identification device has been powered ON, a device configuration is executed and an initial protocol configuration for each communication protocol is executed before or/and during a first execution of this communication protocol. Then, when the identification device leaves the Standby state with respect to this communication protocol or/and after the identification device has left said Standby state because the corresponding field detector has again detected the reception of the corresponding interrogation field, a re-initialization procedure of the communication protocol is executed. In a first main variant, such a re-initialization procedure is fully executed in an automatic way when the identification device leaves this Standby state, i.e. this re-initialization procedure is triggered by the corresponding field detector and its start defines the event of leaving the Standby state. In a second main variant, when the identification device leaves this Standby state, at least a part of the re-initialization procedure is done in relation with at least a command received by the corresponding reader, this identification device waiting for such a command in order to execute at least a part of the re-initialization procedure.

In a preferred variant, the re-initialization procedure of a communication protocol comprises a reset of this communication protocol, if not already done when entering the corresponding Standby state, and a protocol reconfiguration. In a specific variant, the protocol reconfiguration substantially corresponds to the initial protocol configuration.

In a particular variant, data intervening in the device configuration and related to a communication protocol are read again during the re-initialization procedure, in particular the reading of data concerning allowed communication modes for this communication protocol or a protocol selection relative to this communication protocol. The reloading of these device configuration data is done in particular during an initial phase of the re-initialization procedure. However, it is to be noted that the re-initialization procedure can have an initial step wherein the communication protocol is first activated when at least a part of the corresponding interface was deactivated during the Standby state.

In a general embodiment, the first frequency of the first interrogation field is within the UHF range and the second frequency of the second interrogation field is within the HF range. In a main variant, the first communication protocol is according to the EPC standard and the second communication protocol is according to the NFC standard.

BRIEF DESCRIPTION OF THE DRAWINGS

The present invention will be described subsequently in more detail with reference to the attached drawing, given by way of example, but in no way limited thereto, in which.

DETAILED DESCRIPTION OF THE INVENTION

Figure 1:
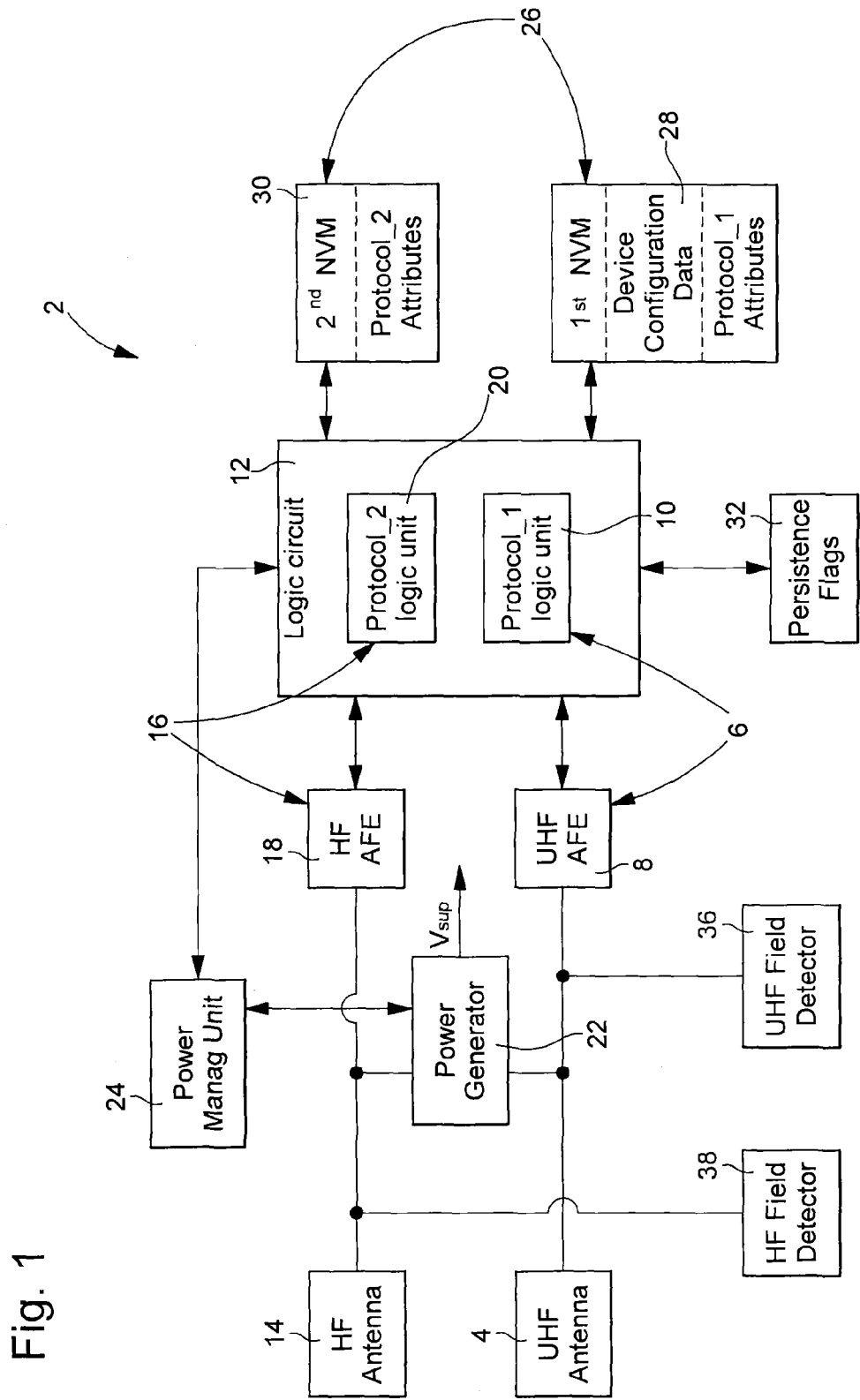
FIG. 1 is a schematic representation of a passive dual frequency and dual protocol RF identification device according to the invention.

With reference to FIG. 1, a passive HF-UHF identification device 2 arranged for allowing the implementation of the protocol management method of the invention will be first described. This identification device 2 comprises an UHF antenna 4 for receiving an UHF electromagnetic field, an UHF interface 6 formed by an UHF analog front end 8 (UHF AFE) and an UHF logic unit 10 (Protocol_1 logic unit) which is part of the global logic circuit 12. The device 2 also comprises an HF antenna 14 for receiving an HF electromagnetic field, an HF interface 16 formed by an HF analog front end 18 (HF AFE) and an HF logic unit 20 (Protocol_2 logic unit) which is also part of the logic circuit 12. The device 2 further comprises non-volatile memory means 26, device reset means supported by the logic circuit 12, a power generator 22 providing a supply voltage $V_{sup}$ and a power management unit 24. The UHF interface is arranged for carrying out an UHF protocol (Protocol_1) and the HF Interface is arranged for carrying out an HF protocol (Protocol_2). The non-volatile memory means are formed by a first non-volatile memory 28 ($1^{st}$ NVM) and a second non-volatile memory 30 ($2^{nd}$ NVM). The logic circuit 12 supports operations common to both interfaces 6 and 16 or dedicated to one or the other of these interfaces, as well as general functions in relation to the power management unit and the non-volatile memories, and also to persistence flags 32 mainly related to the UHF protocol. These persistence flags are part of the analog circuit and formed by capacitors.

The power generator is arranged so that the passive device 2 can harvest power from an incoming HF interrogation field received by the HF antenna and from an incoming UHF interrogation field received by the UHF antenna. Thus, the power generator comprises first rectifying means for a received UHF interrogation field and second rectifying means for a received HF interrogation field. The power generator and the power management unit are arranged so that the first rectifying means provides a supply voltage to the device at least when the power generated by the first rectifying means is higher than the power generated by the second rectifying means. The power management unit is arranged for detecting at least if the available power at the output of the power generator has reached certain determined power levels and to communicate this information to the logic circuit 12, i.e. this power management unit is sensing if the power level that the power generator can provide to the passive device 2 has reached at least certain predefined thresholds. In a first variant, the power generator is arranged so that both HF and UHF interrogation fields can simultaneously supply the passive device, independently on which interface is activated. In a second variant, the power management unit determines which rectifier among the first and second rectifier delivers the higher power and selects this rectifier for supplying the passive device 2.

In a preferred variant, the passive identification device 2 is arranged so that the first non-volatile memory 28 ($1^{st}$ NVM) can be powered and be in an active state without powering the second non-volatile memory 30 ($2^{nd}$ NVM). Thus, for the UHF interface, it is possible to have access only to the $1^{st}$ NVM at least in a read mode. The $1^{st}$ NVM consumes substantially a first power in a read mode and the $2^{nd}$ NVM consumes substantially a second power in a read mode which is substantially higher than the first power. To that effect, the $1^{st}$ NVM 28 has a smaller size than the $2^{nd}$ NVM 30. For example, the $1^{st}$ NVM has only 576 bits and the $2^{nd}$ NVM has 2688 bits. However, in this particular embodiment, the first non-volatile memory 28 comprises the data needed for a device configuration. The first non-volatile memory 28 further comprises the attributes needed for a configuration of at least a given communication mode of the UHF protocol, generally named Protocol_1.

The power management unit is arranged for detecting at least:
- a first determined power level provided by the power generator and required for the first communication mode of the UHF protocol (Protocol_1) to be carried out by the device,
- a second determined power level provided by the power generator and substantially higher than the first determined power level, this second determined power level being required for a given communication mode of the HF protocol, generally named Protocol_2, to be carried out by the identification device.

The given communication mode of the HF protocol has access to the second non-volatile memory 30 which thus needs to be powered when this communication mode is active. The attributes needed for at least a final configuration phase of the communication mode of the HF protocol (Protocol_2) are stored in the $2^{nd}$ NVM.

The device is further arranged for allowing an initial configuration of the Protocol_1 and then a first execution of this Protocol_1 when the power provided by the power generator is equal or superior to the first determined power level. Finally, the device is arranged for allowing a full activation of the HF interface together with the second non-volatile memory only when the power provided by the power generator is equal or superior to the second determined power level.

The identification device is arranged for allowing the device reset means to be activated and then an initial device configuration to be executed when the power provided by the power generator is equal or superior to the first determined power level, these steps being triggered by the POR signal generated by a classical POR function implemented in the identification device with respect to the first determined power level. Then, an initial configuration of the UHF protocol is executed after an initial reset of this UHF protocol, this initial configuration being done automatically or preferably only when a corresponding UHF interrogation field has been detected by an UHF field detector 36.

According to a main embodiment of the passive RF identification device of the invention, this identification device is generally arranged for harvesting power from a first reader sending a first interrogation field at a first frequency and from an independent second reader sending a second interrogation field at a second frequency different from the first frequency, this identification device having a first interface arranged to carry out a first communication protocol (Protocol_1) with the first reader and a second interface to carry out a second communication protocol (Protocol_2) with the second reader. This identification device comprises a power generator arranged for allowing the second reader to partially or fully power supply this identification device while the first interface is in an active state and the first communication protocol is executed and for allowing the first reader to partially or fully power supply this identification device while the second interface is in an active state and the second communication protocol is executed; wherein the identification device needs from the power generator at least a first determined power level for the execution of the first communication protocol and at least a second determined power level for the execution of the second communication protocol.

According to the invention, the passive identification device further comprises a first field detector 36 for the first interrogation field, which is at least activated during an execution of the first communication protocol to watch for/to monitor the reception of this first interrogation field, and a second field detector 38 for the second interrogation field, which is at least activated during an execution of the second communication protocol to watch for/to monitor the reception of this second interrogation field.

A general embodiment of the protocol management method, according to the present invention, for a passive RF identification device is characterized in that, if during the execution of any communication protocol among the first and second communication protocols the reception of the corresponding first or second interrogation field is no more detected by the corresponding first field detector 36 or second field detector 38 while the power provided by the power generator remains equal or superior to the corresponding first or second determined power level, then this communication protocol is stopped and the identification device enters a Standby state with respect to this communication protocol. This Standby state is a state in which the power provided by the power generator remains equal or superior to the corresponding first or second determined power level. When the identification device is in the mentioned Standby state, the corresponding first or second field detector continues to watch for/to monitor the reception of the corresponding first or second interrogation field in order to detect if this corresponding first or second interrogation field is again received by the identification device and, if this is the case, to trigger a restart of the concerned communication protocol.

Figure 2:
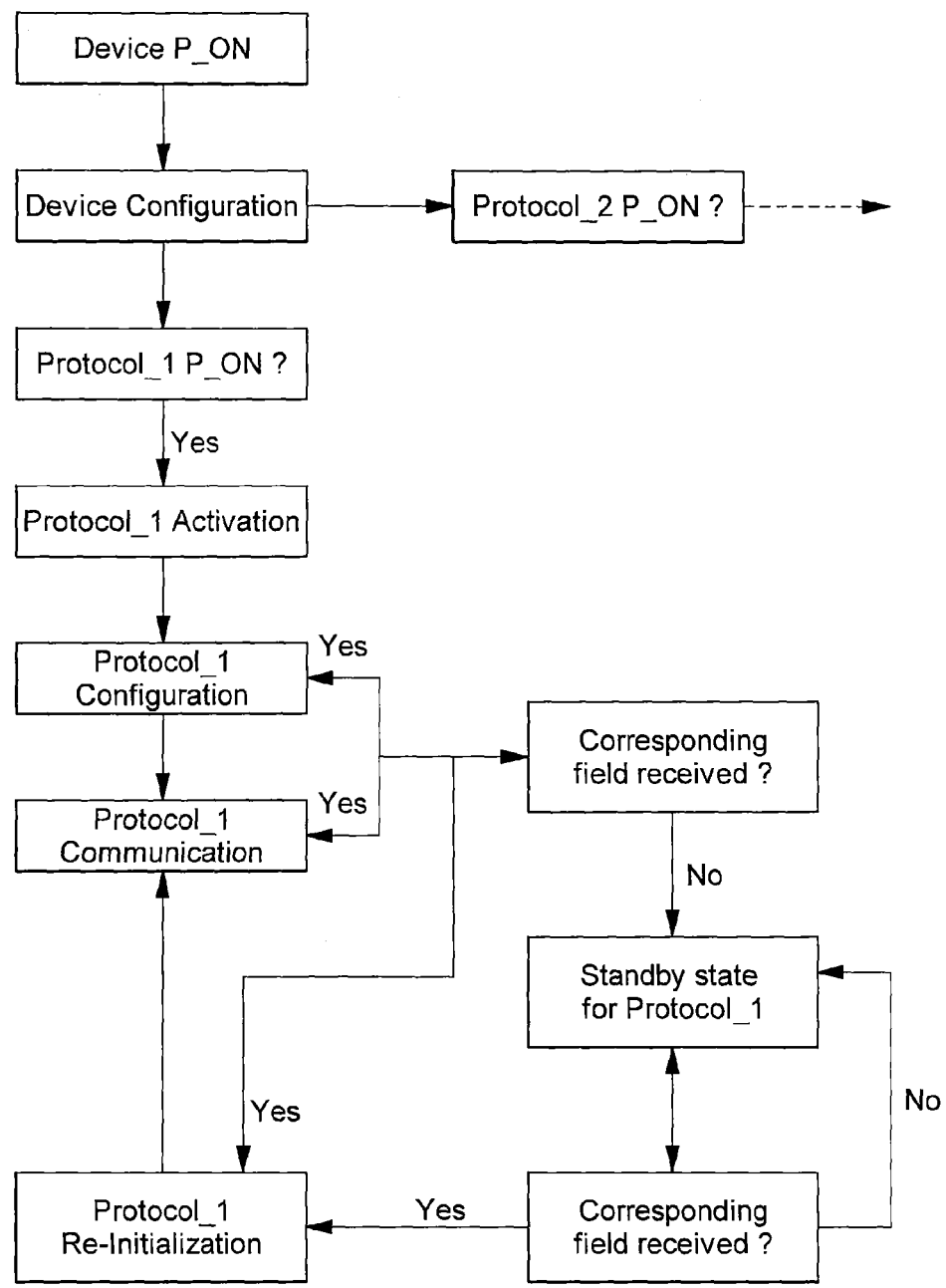
FIG. 2 is a block-diagram of an embodiment of a protocol management method according to the invention implemented in the identification device of FIG. 1.

A main embodiment of the protocol management method of the invention and diverse variants will be described in the following with reference to FIG. 2.

Before entering the interrogation field of at least any one of the associated readers, the identification device 2 (hereafter also named transponder) is in a power-down state. When entering the communication space of at least one of these readers, the transponder 2 will start to receive at least one interrogation field which will supply the power generator 22 and we assume that this power generator then provides at least a first determined power level which is high enough for activating the transponder, so that this transponder is in an initial state 'Device P_ON'. A classical POR function then activates the logic circuit 12 which first resets the transponder. Then, the transponder is configured at step 'Device Configuration' wherein in particular trimming values are read in the $1^{st}$ NVM 28 for the trimming of an UHF oscillator and for setting a voltage reference and a current reference. This device configuration may also concern further functions related to the security level required by the transponder, e.g. password requirement, to a selection of communication modes or allowed protocols, to a display if any, etc.

After or during the device configuration, the transponder senses the power level in order to check if the power level required by any one of the possible protocols (Protocol_1 and Protocol_2) is available. In the following we assume that this is the case for a general Protocol_1. Before the required power level has been reached, the protocol is OFF, i.e. in a non-activation state. In this state, some parts of the corresponding interface and of the associated non-volatile memories may already be activated, but there is not enough power for allowing the corresponding interface to carry out Protocol_1. After the required power level for Protocol_1 has been detected by the power detection means, this Protocol_1 is ON (P_ON state) and is activated (such an activation can be done by step, in particular for a certain NVM activated only if a request for accessing it is received), as this is assumed in the further description of FIG. 2. Then, a Protocol_1 initial configuration is executed and a communication according to this Protocol_1 occurs (execution of Protocol_1). Diverse variants may be implemented after the protocol activation at P_ON, as this will be more evident after in the description of the UHF-EPC protocol and of the HF-NFC protocol. Among these variants, we can already mention the following variants:

A) when Protocol_1 P_ON has been detected, then the transponder checks if the corresponding interrogation field is detected by the corresponding field detector before fully activating the Protocol_1, in particular the associated interface;

B) Before fully activating Protocol_1, a first step of the initial configuration may already be executed;

C) The initial configuration of Protocol_1 may start automatically as a consequence of the detection of P_ON or may require, at least for a final step, a command from an associated reader sending the corresponding interrogation field;

D) The initial configuration may be executed only if the corresponding interrogation field is still detected by the corresponding field detector in the case such a detection was already implemented for the Protocol_1 activation or if the corresponding interrogation field is first detected by the corresponding field detector when the activation was triggered only by P_ON detection.

Thus, an initial protocol configuration for each communication protocol is executed before or/and during a first execution of this communication protocol.

At least during the execution of a Protocol_1 communication and preferably already during the initial configuration, the corresponding field detector continues to sense the presence of the corresponding interrogation field in order to detect if the reception of this interrogation field by the transponder is ongoing or not. If the reception of the interrogation field remains, then the execution of Protocol_1 continues normally. However, if this reception is no more detected, then the transponder enters a Standby state with respect to Protocol_1. We continue to assume that the P_ON state for Protocol_1 is still valid.

According to an advantageous variant, Protocol_1 is reset when the transponder enters the Standby state with respect to Protocol_1.

According to a particular embodiment, the corresponding interface carrying out Protocol_1 is at least partially deactivated when the transponder enters the Standby state with respect to Protocol_1. In a first variant, an analog front end (AFE) of the corresponding interface is deactivated while the corresponding field detector remains active. In a second variant, a logic unit of the corresponding interface is at least partially deactivated when the transponder is in the Standby state relative to Protocol_1.

It is important to note that the defined Standby state concerns a situation where the associated protocol could be activated and in its P_ON state. In a specific embodiment, the Standby state and the non-activation state (Protocol P_OFF) could be differentiated only by the logical state of the P_ON detection relative to the concerned protocol. Nevertheless, such a difference is very relevant because a classical transponder may be arranged so that a protocol is at least partially deactivated at a P_OFF detection and then, at each new P_ON detection, always goes through an activation of the corresponding interface and executes a configuration of this protocol. This means that a partial deactivation, a new activation and following configuration are in classical transponders triggered by the power level detection, at each transition from the protocol P_ON state to the protocol P_OFF state, respectively from the P_OFF state to the P_ON state. However, before entering a Standby state and in this Standby state there is no P_OFF/P_ON detection because there is no transition from the P_ON state to the P_OFF state, respectively form the P_OFF state to the P_ON state. Therefore, the transponder enters a non-activation state with respect to the concerned communication protocol if during the related Standby state the power provided by the power generator falls under the corresponding required power level. The transponder leaves this non-activation state if the power provided by the power generator is again equal or superior to the required power level.

According to a main embodiment, the identification device leaves the Standby state associated to Protocol_1 after the corresponding field detector has again detected the reception of the corresponding interrogation field and a re-initialization procedure of Protocol_1 is executed when the identification device leaves this Standby state and/or after it has left this Standby state.

In general, the re-initialization procedure of Protocol_1 comprises a reset of this Protocol_1 if such a reset has not already been done when entering the Standby state. Then, in a preferred embodiment, a protocol reconfiguration is executed. In a first variant, the protocol reconfiguration substantially corresponds to the initial protocol configuration mentioned before. In a second variant, the re-initialization procedure corresponds partially to the initial protocol configuration, some attributes of the concerned communication protocol being kept by the identification device during a related Standby state and are not read again if not reprogrammed during this related Standby state or if non-reprogrammable through another communication protocol during such a related Standby state.

In a particular variant, data intervening in the device configuration and related to the concerned communication protocol are read again during the re-initialization procedure, in particular the reloading of data concerning allowed communication modes for this communication protocol (in particular 'muted mode') or a protocol selection relative to this communication protocol (in particular reading of a 'kill' bit associated to the protocol).

In the case the corresponding interface of Protocol_1 was at least partially deactivated when the transponder entered the related Standby state, this interface is again activated during the re-initialization procedure, in particular in an initial phase of this re-initialization procedure.

A particular embodiment of the invention concerns a dual frequency and dual protocol transponder. This transponder can communicate with a first reader sending a first interrogation field having a first frequency within the UHF range and with an independent second reader sending a second interrogation field having a second frequency within the HF range. The transponder is arranged for executing a first communication protocol according to the EPC standard (EPC protocol) with the first reader and a second communication protocol according to the NFC standard (NFC protocol) with the second reader. In the following, some specific features of an implementation of the protocol management method relative to the EPC protocol, respectively to the NFC protocol for the transponder 2 of FIG. 1 will be described. Thus, in the following, Protocol_1 corresponds in FIG. 1 to the EPC protocol and Protocol_2 to the NFC protocol. However, the teaching given before for Protocol_1 with reference to FIG. 2 is valid, when applicable, either for the EPC protocol or for the NFC protocol, or for both EPC and NFC protocols.

In the transponder 2, the power level for a device P_ON is identical to the required power level (EPC P_ON) for the execution of a limited communication mode of the EPC protocol. Thus, at device P-ON, the transponder 2 is reset and a device configuration is then executed. A limited communication mode of the EPC protocol is then activated (the UHF interface and only the $1^{st}$ NVM 28 are activated) and an initial configuration of the EPC protocol can directly occur. In a particular variant, this initial configuration is triggered by the device P_ON detection corresponding to EPC P_ON. An EPC extended communication mode with access to the $2^{nd}$ NVM 30 can occur at a higher power level that will also be detected by the power detection means. The transponder 2 comprises, in addition to the NVMs, persistence flags formed by capacitors which have to be periodically recharged during the execution of the EPC protocol. When the transponder 2 enters the Standby state related to the EPC protocol, the recharging of these persistence flags is disabled and the EPC protocol is reset. When the UHF interrogation field is anew detected, the transponder leaves the Standby state with respect to the EPC protocol and a re-initialization procedure for this EPC protocol is then automatically executed.

In the EPC re-initialization procedure, the EPC protocol is set in its initial state and a reconfiguration of the EPC protocol is done. This EPC reconfiguration substantially corresponds to the EPC initial configuration. Thus, the EPC reconfiguration consists in particular to calculate anew the StoredCRC (specific to EPC protocol), to read/reload the memory lock bits related to the 1st NVM 28, sharing lock bits related to the $2^{st}$ NVM 30 and also anti-tearing protection status bits for these NVMs. It is to be noted that these lock bits and status bits can have been modified via the NFC protocol during the Standby state with respect to the EPC protocol. It is also to be noted that the sharing lock bits and the anti-tearing protection status bits relative to the $2^{nd}$ NVM 30 can be refreshed only when a specific request for accessing the $2^{nd}$ NVM is received. Thus, for the extended communication mode, a part of the EPC reconfiguration is done just before an extended communication mode is implemented. Further, the refresh of these sharing lock bits and status bits can be done at each request for accessing the $2^{nd}$ NVM, when enough power is available, specifically for the part of the $2^{nd}$ NVM concerned by such a request, as this may also be the case in the frame of the initial configuration of the extended communication mode.

Concerning the NFC protocol, the HF interface is ready for executing a NFC communication after the activation of the NFC protocol when the required power level for such an execution is available (NFC P_ON), NFC P_ON being substantially higher than EPC P_ON. Thus, the activation of the NFC Protocol/interface may occur after a certain period of time following the transponder P_ON detection. The initial configuration of the NFC protocol (attributes specifically related to this NFC protocol) is then done only after the receipt of a first request from an associated NFC reader by reading the specific attributes of the NFC protocol in the $2^{nd}$ NVM 30, in particular during the sending of a response to this NFC reader.

In the Standby state relative to the HF-protocol (NFC protocol), at least the HF interface is preferably deactivated. Then, in a particular variant, the second non-volatile memory 30 associated to the HF interface carrying out this NFC communication protocol is also preferably deactivated when the identification device enters the NFC Standby state if this $2^{nd}$ NVM is not shared at that time with the UHF communication interface executing an extended UHF communication mode. In another variant, the activation and deactivation of the $2^{nd}$ NVM is not triggered by entering or leaving the Standby state, and the activation is also not triggered by an UHF command requesting an access to this $2^{nd}$ NVM or to execute the extended UHF communication mode, but only by the power level that the power generator can provide. In this last case, when the power level that the power generator is able to provide reaches a third determined power level between the first and second determined power levels (before mentioned) or, in a simplified variant, this second determined power level, then the $2^{nd}$ NVM is activated and will remain active until the power level falls again under the third determined power level, respectively the second power level. In the case the HF interface and/or the $2^{nd}$ NVM were deactivated when the identification device has entered the NFC Standby state, the HF interface and the $2^{nd}$ NVM will again be activated, as a step of the re-initialization procedure, when the identification device leaves this NFC Standby state or after the identification device has left this NFC Standby state, i.e. after a certain delay or time period during which the device can execute another initial step of the re-initialization procedure, e.g. a partial reconfiguration notably related to device configuration data. If this partial reconfiguration indicates that the NFC communication mode has been turned to 'muted' (in the muted mode the HF field received by the identification device is used only as an energizing field), the identification device will stop the ongoing re-initialization procedure with respect to the NFC protocol, and generally deactivate the NFC interface.

After having left the NFC Standby state and after the first steps of the re-initialization procedure have been executed (reading of configuration data relative to a communication mode selection or actual allowed protocol(s), the activation of the NFC interface and of the $2^{nd}$ NVM assuming a NFC protocol can be executed), the identification device waits for a first request ($1^{st}$ command) from an HF-NFC reader. When such a request is received, the NFC protocol will be further reconfigured by reading/reloading attributes of this NFC protocol and the NFC protocol will be further executed. For example, these attributes are memory lock bits (related to the $2^{nd}$ NVM) and sharing lock bits (related to the $1^{st}$ NVM) as well as anti-tearing protection status bits. This last phase of reconfiguration is generally identical to the initial configuration occurring during a first execution of the NFC communication protocol after power_ON of the identification device. In a general case, this last phase of reconfiguration can be partially different from the initial configuration of the concerned protocol.

The UHF field detector and the HF field detector can each be formed in a first variant by a frequency detector (frequency discriminator) or in a second variant by a voltage detector arranged after the UHF rectifier, respectively after the HF rectifier (this voltage detector detecting if a given voltage level has been reached). In a specific variant, the field detector may also comprise a preamble detector showing that a certain modulation of the carrier frequency occurs.

What is claimed is:

1. A protocol management method for a passive RF identification device which is arranged for harvesting power from a first reader sending a first interrogation field at a first frequency and from an independent second reader sending a second interrogation field at a second frequency different from the first frequency, this identification device having a first interface arranged to carry out a first communication protocol with the first reader and a second interface to carry out a second communication protocol with the second reader, this identification device comprising a power generator arranged for allowing the second reader to partially or fully power supply this identification device while the first interface is in an active state and the first communication protocol is executed and for allowing the first reader to partially or fully power supply this identification device while the second interface is in an active state and the second communication protocol is executed; wherein the identification device needs from the power generator at least a first determined power level for the execution of the first communication protocol and at least a second determined power level for the execution of the second communication protocol;

wherein the identification device comprises a first field detector for the first interrogation field, which is at least activated during an execution of the first communication protocol to watch for the reception of this first interrogation field, and a second field detector for the second interrogation field, which is at least activated during an execution of the second communication protocol to watch for the reception of this second interrogation field; wherein, if during the execution of any communication protocol among the first and second communication protocols the reception of the corresponding first or second interrogation field is no more detected by the corresponding first or second field detector while the power provided by the power generator remains equal or superior to the corresponding first or second determined power level, then this communication protocol is stopped and the identification device enters a Standby state with respect to this communication protocol, this Standby state being a state in which the power provided by the power generator remains equal or superior to the corresponding first or second determined power level; and wherein, when the identification device is in said Standby state, said corresponding first or second field detector continues to watch for the reception of said corresponding first or second interrogation field in order to detect if this corresponding first or second interrogation field is again received by the identification device and, if this is the case, to trigger a restart of said any communication protocol.

2. The protocol management method according to claim 1, wherein said any communication protocol is reset when the identification device enters the Standby state with respect to this communication protocol.

3. The protocol management method according to claim 2, wherein the first frequency of the first interrogation field is within the UHF range and the first communication protocol corresponds to the EPC standard, and wherein the identification device further comprises persistence flags formed by capacitors which are periodically recharged during the execution of the first communication protocol according to the EPC standard, wherein the recharging of these persistence flags is disabled when the identification device enters the Standby state with respect to this first communication protocol.

4. The protocol management method according to claim 2, wherein, after the identification device has been powered ON, a device configuration is executed, and wherein an initial protocol configuration for each communication protocol among the first and second communication protocols is executed before or/and during a first execution of this communication protocol; wherein the identification device leaves said Standby state after the corresponding first or second field detector has again detected the reception of the corresponding first or second interrogation field; and wherein a re-initialization procedure of said any communication protocol is executed when the identification device leaves said Standby state and/or after it has left this Standby state.

5. The protocol management method according to claim 4, wherein the re-initialization procedure of said any communication protocol comprises a reset of this communication protocol, if not already done when entering said Standby state, and a protocol reconfiguration.

6. The protocol management method according to claim 5, wherein data intervening in the device configuration and related to said any communication protocol are read again during said re-initialization procedure, in particular the reading of data concerning allowed communication modes for said any communication protocol or a protocol selection relative to this any communication protocol.

7. The protocol management method according to claim 4, wherein the corresponding first or second interface carrying out said any communication protocol is at least partially deactivated when the identification device enters said Standby state; and wherein the corresponding first or second interface is again activated during said re-initialization procedure.

8. The protocol management method according to claim 1, wherein the corresponding first or second interface carrying out said any communication protocol is at least partially deactivated when the identification device enters said Standby state.

9. The protocol management method according to claim 8, wherein an analog front end of the corresponding first or second interface is deactivated while the corresponding first or second field detector remains active when the identification device is in said Standby state.

10. The protocol management method according to claim 8, wherein a logic unit of the corresponding first or second interface is at least partially deactivated when the identification device is in said Standby state.

11. The protocol management method according to claim 8, wherein a non-volatile memory, associated to the corresponding first or second interface carrying out said any communication protocol and not shared with a further active communication protocol of the identification device, is deactivated when the identification device enters said Standby state.

12. The protocol management method according to claim 1, wherein the identification device enters a non-activation state with respect to said any communication protocol if during said Standby state with respect to said any communication protocol the power provided by the power generator falls under said corresponding first or second determined power level, the identification device leaving this non-activation state only if the power provided by the power generator is again equal or superior to said corresponding first or second determined power level.

13. The protocol management method according to claim 1, wherein, after the identification device has been powered ON, a device configuration is executed, and wherein an initial protocol configuration for each communication protocol among the first and second communication protocols is executed before or/and during a first execution of this communication protocol; wherein the identification device leaves said Standby state after the corresponding first or second field detector has again detected the reception of the corresponding first or second interrogation field; and wherein a re-initialization procedure of said any communication protocol is executed when the identification device leaves said Standby state and/or after it has left this Standby state.

14. The protocol management method according to claim 13, wherein the re-initialization procedure of said any communication protocol comprises a reset of this communication protocol, if not already done when entering said Standby state, and a protocol reconfiguration.

15. The protocol management method according to claim 14, wherein the protocol reconfiguration substantially corresponds to said initial protocol configuration.

16. The protocol management method according to claim 14, wherein said re-initialization procedure corresponds partially to said initial protocol configuration, some attributes of this communication protocol being kept by the identification device during said Standby state and not read again if not reprogrammed during this Standby state or if non-reprogrammable through another communication protocol during such a Standby state.

17. The protocol management method according to claim 14, wherein data intervening in the device configuration and related to said any communication protocol are read again during said re-initialization procedure, in particular the reading of data concerning allowed communication modes for said any communication protocol or a protocol selection relative to this any communication protocol.

18. The protocol management method according to claim 13, wherein the corresponding first or second interface carrying out said any communication protocol is at least partially deactivated when the identification device enters said Standby state; and wherein the corresponding first or second interface is again activated during said re-initialization procedure.

19. The protocol management method according to claim 1, wherein the first frequency of the first interrogation field is within the UHF range and the second frequency of the second interrogation field is within the HF range.

20. The protocol management method according to claim 19, wherein the first communication protocol is according to the EPC standard and the second communication protocol is according to the NFC standard.

* * * * *